(12) United States Patent
Zhang et al.

(10) Patent No.: US 9,417,374 B2
(45) Date of Patent: Aug. 16, 2016

(54) BACKLIGHT MODULE

(71) Applicant: SHENZHEN CHINA STAR OPTOELECTRONICS TECHNOLOGY CO., LTD., Shenzhen, Guangdong (CN)

(72) Inventors: Yanxue Zhang, Shenzhen (CN); YuChun Hsiao, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/240,353

(22) PCT Filed: Jan. 17, 2014

(86) PCT No.: PCT/CN2014/070847
§ 371 (c)(1),
(2) Date: Feb. 21, 2014

(87) PCT Pub. No.: WO2015/066974
PCT Pub. Date: May 14, 2015

(65) Prior Publication Data
US 2015/0153502 A1     Jun. 4, 2015

(30) Foreign Application Priority Data

Nov. 8, 2013   (CN) .......................... 2013 1 0554919

(51) Int. Cl.
*F21V 8/00*   (2006.01)
(52) U.S. Cl.
CPC ............ *G02B 6/0031* (2013.01); *G02B 6/0088* (2013.01); *G02B 6/0085* (2013.01)
(58) Field of Classification Search
None
See application file for complete search history.

(56) References Cited

U.S. PATENT DOCUMENTS

2010/0066937 A1*   3/2010   Yamashita et al. ............... 349/58
2012/0170311 A1*   7/2012   Huang et al. ................... 362/611
(Continued)

FOREIGN PATENT DOCUMENTS

| CN | 101676769 A | 3/2010 |
|----|-------------|--------|
| CN | 101676772 A | 3/2010 |
| CN | 101988659 A1 | 3/2011 |
| CN | 102062326 A | 5/2011 |
| CN | 102081259 A | 6/2011 |
| CN | 102121641 A | 7/2011 |

(Continued)

OTHER PUBLICATIONS

International Search Report dated Jul. 18, 2014, issued to the corresponding International Application No. PCT/CN2014/070847.

*Primary Examiner* — Britt D Hanley
(74) *Attorney, Agent, or Firm* — Stein IP, LLC

(57) ABSTRACT

The present disclosure relates to a backlight module, including a backlight frame and a light guide plate placed inside the backlight frame, wherein a light-emitting element is provided at the inner side of a side wall of the backlight frame, a first reflective sheet is provided at a lower location under the light guide plate along the vertical direction, and a second reflective sheet is provided at a lower location under the light-emitting element along the vertical direction, the second reflective sheet being extended towards the inside of the backlight frame to a lower location under the light guide plate along the vertical direction. Through providing the second reflective sheet located under the light-emitting element and extending to a lower location under the light guide plate, the light scattered out under the light-emitting element can be guided into the light guide plate, thus effectively enhancing the efficiency of incident light guided into the light guide plate from the light-emitting element.

11 Claims, 2 Drawing Sheets

(56) References Cited

U.S. PATENT DOCUMENTS

2012/0287355 A1* 11/2012 Oya ............................. 348/790
2013/0044515 A1* 2/2013 Lu Feng ................. G02B 6/005
　　　　　　　　　　　　　　　　　　　　　362/609
2013/0223094 A1 8/2013 Yang et al. .................... 362/606

FOREIGN PATENT DOCUMENTS

| CN | 202188394 U | 4/2012 |
| CN | 102628570 A | 8/2012 |
| JP | 2009-205866 A | 9/2009 |
| KR | 10-2012-0039243 A | 4/2012 |

* cited by examiner

BACKLIGHT MODULE

TECHNICAL FIELD

The present disclosure relates to the technical field of liquid crystal display (LCD), and in particular to a backlight module.

BACKGROUND

It is well known that thin film transistor-liquid crystal display (TFT-LCD) is one of the main products of current flat panel display. It has become an important display platform for modern information technology and video product. Since liquid crystal itself does not emit light, a backlight module is required in order to implement the display function thereof.

Nowadays, mainstream backlight modules generally use a side-access type backlight. In the backlight module, a light-emitting element is firstly provided on the inner side of a side wall of a backlight frame, and then light is guided to a display area through a light guide plate (LGP) mounted on the backlight frame. To ensure the light coupling efficiency between the light-emitting element and the light guide plate, i.e., the efficiency of incident light guided into the light guide plate from the light-emitting element, a reflective sheet is provided at the bottom of the light guide plate along the vertical direction, which is the direction along a vertical line passing through the light guide plate and the bottom of the backlight frame. Generally, the size of the reflective sheet along the horizontal direction, which is the direction orthogonal to the vertical direction and includes a longitudinal direction and a transversal direction, is equal to that of the light guide plate. That is to say, the reflective sheet is flush with the light guide plate.

In practice, it is found that when the reflective sheet extends along the horizontal direction to a lower location of the light-emitting element in the vertical direction, the efficiency of incident light guided into the light guide plate from the light-emitting element increases at least 3% compared with the situation when the reflective sheet is flush with the light guide plate. In some actual examples, the brightness of the display as measured increases from 4735 nit to 4890 nit. Therefore, the reflective sheet should be arranged as extending to the bottom of the light-emitting element along the vertical direction as much as possible.

At present, there are two types of typical methods for the arrangement of the reflective sheet. In one method, the reflective sheet is bonded to the bottom of the light guide plate, and extends to a lower location under the light-emitting element along the vertical direction. However, in this case, the expansion and compression of the reflective sheet induced by temperature and humidity to which the reflective sheet is subjected would be restricted, thereby resulting uneven bright and dark areas, i.e. wave-shape strips, present in the picture generated when such a backlight module is used. In the other method, the reflective sheet is placed between the light guide plate and the backlight frame in a free state, and extends to the lower location under the light-emitting element along the vertical direction. However, in this case, the reflective sheet mounted in the backlight module may be retracted from the lower location under the light-emitting element along the vertical direction, thereby failing to achieve the object of enhancing the efficiency of incident light.

SUMMARY OF THE INVENTION

With regard to the above-mentioned defects existing in the prior art, an object of the present disclosure is to provide a backlight module, which may effectively enhance the efficiency of incident light guided into the light guide plate from the light-emitting element.

1) A backlight module provided in the present disclosure includes a backlight frame and a light guide plate placed inside the backlight frame, wherein a light-emitting element is provided at the inner side of a side wall of the backlight frame, a first reflective sheet is provided at a lower location under the light guide plate along the vertical direction, and a second reflective sheet is provided at a lower location under the light-emitting element along the vertical direction, the second reflective sheet being extended towards the inside of the backlight frame to a lower location under the light guide plate along the vertical direction.

2) In one preferred embodiment according to Item 1) of the present disclosure, the second reflective sheet is located under the first reflective sheet along the vertical direction.

3) In one preferred embodiment according to Item 1) or 2) of the present disclosure, the first reflective sheet extends towards the side wall of the backlight frame to a lower location under the light-emitting element along the vertical direction.

4) In one preferred embodiment according to any one of Item 1) to Item 3) of the present disclosure, an elastic supporting member for buffering is provided between a lower location under the light guide plate along the vertical direction and an upper location above the bottom of the backlight frame along the vertical direction, and an accommodation recess for receiving the second reflective sheet is formed on the top of the elastic supporting member along the vertical direction.

5) In one preferred embodiment according to Item 4) of the present disclosure, the second reflective sheet is engaged into the accommodation recess.

6) In one preferred embodiment according to Item 4) of the present disclosure, the second reflective sheet is bonded into the accommodation recess.

7) In one preferred embodiment according to any one of Item 1) to Item 6) of the present disclosure, a cooling fin is further provided between the light-emitting element and the backlight frame.

8) In one preferred embodiment according to any one of Item 1) to Item 7) of the present disclosure, the light guide plate is secured to the backlight frame from inside using a snap plate via a snap connection.

9) In one preferred embodiment according to any one of Item 1) to Item 8) of the present disclosure, the light-emitting element is an LED light source.

Compared with the prior art, in the backlight module of the present disclosure, the light scattered out under the light-emitting element can be guided into the light guide plate by means of the second reflective sheet arranged under the light-emitting element and extending to a lower location under the light guide plate, thereby effectively enhancing the efficiency of incident light guided into the light guide plate from the light-emitting element.

In a further technical solution, the second reflective sheet is located under the first reflective sheet, in order to facilitate the arrangement of the second reflective sheet. Meanwhile, the portion of the second reflective sheet extending to a lower location under the light guide plate forms an overlapping region with the first reflective sheet, so that there is no interface gap existing between the first reflective sheet and the second reflective sheet, thereby further ensuring that the light scattered out under the light-emitting element can be guided into the light guide plate. Consequently, the efficiency of incident light guided into the light guide plate from the light-emitting element can be effectively enhanced.

In a further technical solution, the first reflective sheet extends to a lower location under the light-emitting element. In this manner, the light under the light-emitting element can be directly guided into the light guide plate through the first reflective sheet. In addition, there is no interface gap existing between the first reflective sheet and the second reflective sheet since an overlapping region is formed by the first reflective sheet and the second reflective sheet. Therefore, it is further ensured that the light scattered out under the light-emitting element can be guided into the light guide plate, thus effectively enhancing the efficiency of incident light guided into the light guide plate from the light-emitting element.

In a further technical solution, the light guide plate can be protected through the elastic supporting member for buffering located between the light guide plate and the backlight frame. Meanwhile, the accommodation recess on the top of the elastic supporting member is used to receive the second reflective sheet, so that the position of the second reflective sheet can be restricted by the accommodation recess, thus ensuring that the second reflective sheet is always located under the light-emitting element and extends to a lower location under the light guide plate, and further ensuring that the light scattered out under the light-emitting element can be guided into the light guide plate. Consequently, the efficiency of incident light guided into the light guide plate from the light-emitting element can be effectively enhanced.

In a further technical solution, the second reflective sheet is engaged into the accommodation recess. The position of the second reflective sheet is thus ensured by the engagement action provided by the accommodation recess.

In a further technical solution, the second reflective sheet is bonded into the accommodation recess. The position of the second reflective sheet is thus ensured by the bonding connection.

In a further technical solution, the cooling fin is provided between the light-emitting element and the backlight frame for heat dissipation.

In a further technical solution, the light guide plate is secured to the backlight frame from inside using a snap plate via a snap connection, so as to facilitate the installation thereof.

The foregoing technical features can be combined with each other in any suitable manner or be replaced with equivalent ones, as long as the object of the present disclosure can be achieved.

BRIEF DESCRIPTION OF DRAWINGS

In the following the present disclosure will be described in details with reference to the accompanying drawings and based on embodiments which are provided in a non-limiting sense only. In drawings.

REFERENCE LIST

1 backlight frame,
2 light guide plate,
3 light-emitting element,
4 first reflective sheet,
5 second reflective sheet,
6 elastic supporting member,
7 accommodation recess,
8 cooling fin,
9 snap plate.

DETAILED DESCRIPTION OF EMBODIMENTS

In order to enable the objects, technical solutions and advantages of the present disclosure more clearly, the technical solutions of the present disclosure will be described in a clear and complete manner hereinafter. All other embodiments obtained by one skilled in the art based on the embodiments as disclosed in the present disclosure without involvement of any creative work are deemed as falling within the protection scope of the present disclosure.

Before describing the embodiments, directional terms mentioned in the present disclosure are defined as follows. In a backlight module, as shown in FIG. 1, the direction perpendicular to the light guide plate 2 and the bottom of the backlight frame 1 is defined as the vertical direction V; the side facing towards the bottom of the backlight frame 1 is defined as the lower location or the bottom; the side facing away from the bottom of the backlight frame 1 is defined as the upper location or the top; and the side of a side wall of the backlight frame 1 facing towards the light guide plate 2 is defined as the inner side.

Figure 1:
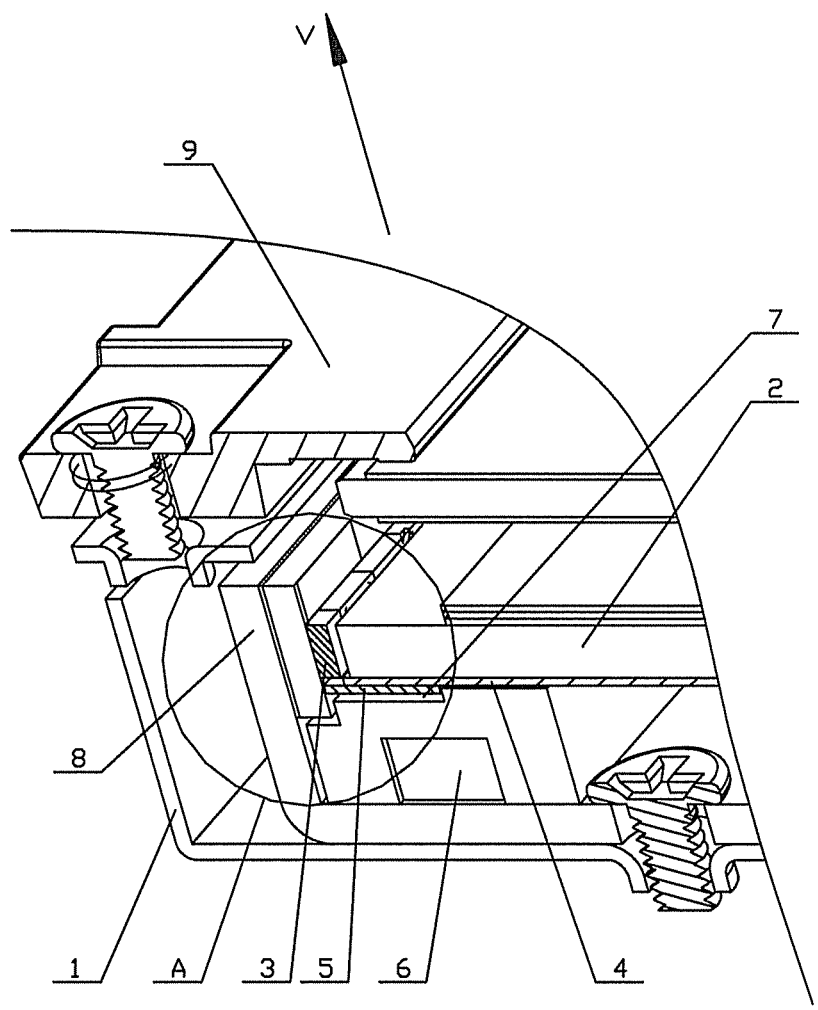
FIG. 1 schematically shows a partial structural view of the backlight module provided in an embodiment of the present disclosure.
Figure 2:
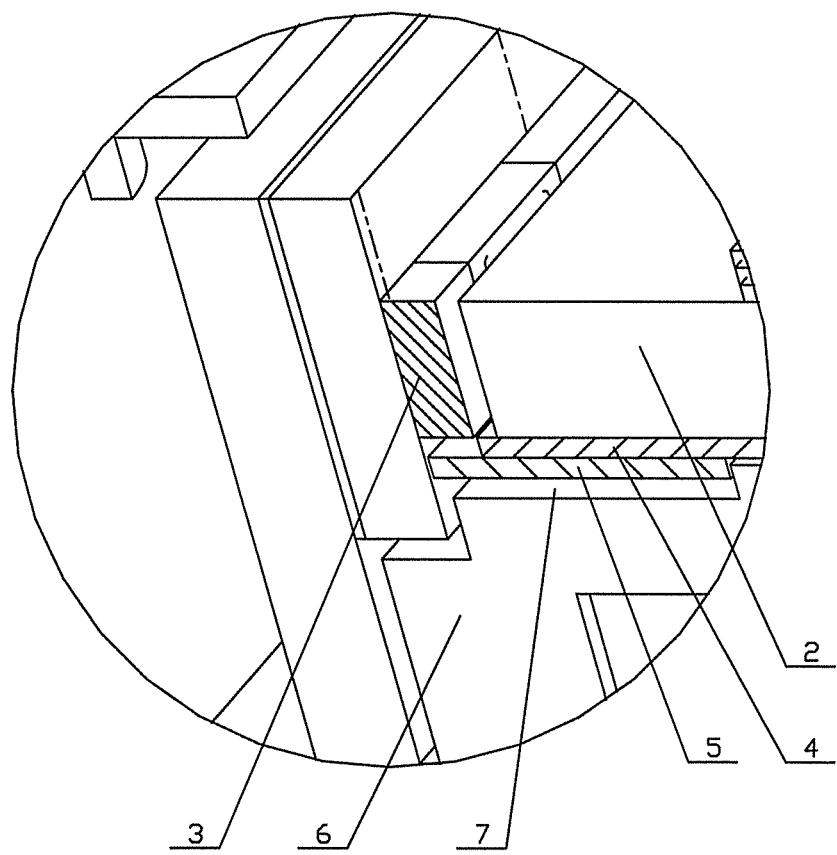
FIG. 2 shows area A of FIG. 1 in a partial enlarged view.

As shown in FIGS. 1 and 2, the backlight module provided in this embodiment includes a backlight frame 1 and a light guide plate 2 placed within the backlight frame 1, wherein a light-emitting element 3 is provided at the inner side of a side wall of the backlight frame 1. A first reflective sheet 4 is provided at a lower location under the light guide plate 2 along the vertical direction, and a second reflective sheet 5 is provided at a lower location under the light-emitting element 3 along the vertical direction. The second reflective sheet 5 extends towards the inside of the backlight frame 1 to a lower location under the light-emitting element 2 along the vertical direction.

By means of the second reflective sheet 5 which is arranged under the light-emitting element 3 and extends to a lower location under the light guide plate 2, the light scattered out under the light-emitting element 3 can be guided into the light guide plate 2, thereby effectively enhancing the efficiency of incident light guided into the light guide plate 2 from the light-emitting element 3.

It should be noted that the light-emitting element 3 can be provided at the inner side of any one of the side walls of the backlight frame 1, or may be simultaneously provided at the inner side of two opposite side walls of the backlight frame 1, or further may be simultaneously provided at the inner side of four side walls of the backlight frame 1 surrounding the light guide plate 2. Thus the light-emitting element 3 can be arranged in several manners, which should be all deemed as falling within the protection scope of the present disclosure. Meanwhile, it should be ensured that a second reflective sheet 5 is provided at a lower location under each light-emitting element 3 along the vertical direction, and extends towards the inside of the backlight frame 1 to a lower location under the light-emitting element 3 along the vertical direction, no matter on which side wall the light-emitting element is provided at the inner side and how many the light-emitting element 3 are provided.

In an embodiment, the first reflective sheet 4 is provided at a lower location under the light guide plate 2 along the vertical direction, and the second reflective sheet 5 extends to a lower location under the light guide plate 2 along the vertical direction. Therefore, the second reflective sheet 5 can be located under the first reflective sheet 4 along the vertical direction, in order to facilitate the arrangement of the second reflective sheet. Placing the second reflective sheet 5 under the first reflective sheet 4 can facilitate the installation of the second reflective sheet 5. Meanwhile, the portion of the second reflective sheet 5 extending to a lower location under the light guide plate 2 forms an overlapping region with the first reflective sheet 4, so that there is no interface gap existing between the first reflective sheet 4 and the second reflective sheet 5, thereby further ensuring that the light scattered out under the light-emitting element 3 can be guided into the light guide plate 2. Consequently, the efficiency of incident light guided into the light guide plate 2 from the light-emitting element 3 can be effectively enhanced.

In an embodiment, the size of the first reflective sheet 4 along the horizontal direction, which is the direction orthogonal to the vertical direction and includes a longitudinal direction and a transversal direction, is designed as being equal to that of the light guide plate 2. That is, the first reflective sheet 4 is flush with the light guide plate 2 in the horizontal direction. In this manner, if the second reflective sheet 5 is fixedly arranged under the light-emitting element 3 along the vertical direction, the efficiency of incident light guided into the light guide plate 2 from the light-emitting element 3 would not be influenced. However, if the second reflective sheet 5 is arranged under the light-emitting element 3 along the vertical direction in a free state, the second reflective sheet 5 may be retracted from a lower location under the light-emitting element 3 along the vertical direction, thereby failing to enhance the incident light efficiency. To this end, the first reflective sheet 4 can be configured to extend towards the side wall of the backlight frame 1 to a lower location under the light-emitting element 3 along the vertical direction. In this case, the first reflective sheet 4 extends to a lower location under the light-emitting element 3, thereby the light under the light-emitting element 3 can be directly guided into the light guide plate 2 through the first reflective sheet 4. In addition, there is no interface gap existing between the first reflective sheet 4 and the second reflective sheet 5 since an overlapping region is formed by the first reflective sheet 4 and the second reflective sheet 5. Therefore, it is further ensured that the light scattered out under the light-emitting element 3 can be guided into the light guide plate 2, thus effectively enhancing the efficiency of incident light guided into the light guide plate 2 from the light-emitting element 3.

In an embodiment, since the light guide plate 2 is placed in the backlight frame 1, an elastic supporting member 6 for buffering is provided between a lower location under the light guide plate 2 along the vertical direction and an upper location above the bottom of the backlight frame 1 along the vertical direction, and an accommodation recess for receiving the second reflective sheet 5 is formed on the top of the elastic supporting member 6 along the vertical direction, in order to enhance the safety of the light guide plate 2 and also prevent a damage to the light guide plate 2 generated by a bump between the light guide plate 2 and the bottom of the backlight frame 1. The light guide plate 2 can be protected through the buffering function provided by the elastic supporting member 6. Meanwhile, the accommodation recess 7 on the top of the elastic supporting member 6 is used to receive the second reflective sheet 5, so that the position of the second reflective sheet 5 can be determined by the accommodation recess 7, thus effectively preventing the second reflective sheet 5 from being retracted from the lower location under the light-emitting element 3 along the vertical direction. In this manner, it can be ensured that the second reflective sheet 5 is always located under the light-emitting element 3 and extends to a lower location under the light guide plate 2, and further ensured that the light scattered out under the light-emitting element 3 can be guided into the light guide plate 2, thus effectively enhancing the efficiency of incident light guided into the light guide plate 2 from the light-emitting element 3.

More preferably, the elastic supporting member 6 is a rubber supporting member.

In an embodiment, the second reflective sheet 5 is engaged in the accommodation recess 7. Through the limiting function provided by the engagement action of the accommodation recess 7 on the position of the second reflective sheet 5, the second reflective sheet 5 can be prevented from being retracted from the lower location under the light-emitting element 3 along the vertical direction. At the same time, the installation and production of the second reflective sheet 5 is more convenient.

In an embodiment, since the size of the second reflective sheet 5 is smaller than that of the first reflective sheet, the expansion or compression amount of the second reflective sheet 5 induced by temperature and humidity to which the second reflective sheet 5 is subjected is naturally smaller. Therefore, in order to ensure the stability of installing the second reflective sheet 5, the second reflective sheet 5 can be bonded into the accommodation recess 7. Through the limiting function provided by the bonding connection on the position of the second reflective sheet 5, the second reflective sheet 5 can be prevented from being retracted from the lower location under the light-emitting element 3 along the vertical direction.

It should be noted that the second reflective sheet 5 can be directly placed into the accommodation recess 7 in a free state.

In a further embodiment, in order to facilitate heat dissipation of the light-emitting element 3, a cooling fin 8 can be further provided between the light-emitting element 3 and the backlight frame 1.

In a further embodiment, in order to facilitate the assembly of the backlight module, the light guide plate 2 is fixed to the backlight frame 1 from inside using a snap plate 9 via a snap connection. In particular, the snap plate 9 can be bolted with the backlight frame 1.

In an embodiment, the light-emitting element 3 is a light source of light-emitting diode (LED).

It should be noted that the above embodiments and examples are purely used to illustrate the technical solutions of the present disclosure, rather than restricting the present disclosure. Although the present disclosure is illustrated in detail with reference to the foregoing embodiments and examples, it should be appreciated by those skilled in the art that modifications still can be made to the technical solutions as recited in the foregoing embodiments or examples, or some technical features therein can be replaced with equivalent ones. The technical solutions with these modifications or replacements would not depart from the spirit and scope of the technical solutions of the embodiments or examples of the present disclosure.

The invention claimed is:

1. A backlight module, comprising:
a backlight frame; and
a light guide plate placed inside the backlight frame;
wherein:
  a light-emitting element is provided at the inner side of a side wall of the backlight frame, and a first reflective sheet is provided at a lower location under the light guide plate along the vertical direction,
a second reflective sheet is provided at a lower location under the light-emitting element along the vertical direction, and the second reflective sheet extends towards the inside of the backlight frame to a lower location under the light guide plate along the vertical direction, an elastic supporting member for buffering is provided between a lower location under the light guide plate along the vertical direction and an upper location above the bottom of the backlight frame along the vertical direction, and an accommodation recess for receiving the second reflective sheet is formed on the top of the elastic supporting member along the vertical direction, and the second reflective sheet is engaged into the accommodation recess.

2. The backlight module according to claim 1, wherein the second reflective sheet is located under the first reflective sheet along the vertical direction.

3. The backlight module according to claim 1, wherein the first reflective sheet extends towards the side wall of the backlight frame to a lower location under the light-emitting element along the vertical direction.

4. The backlight module according to claim 2, wherein the first reflective sheet extends towards the side wall of the backlight frame to a lower location under the light-emitting element along the vertical direction.

5. The backlight module according to claim 1, wherein the second reflective sheet is bonded into the accommodation recess.

6. The backlight module according to claim 1, wherein a cooling fin is further provided between the light-emitting element and the backlight frame.

7. The backlight module according to claim 2, wherein a cooling fin is further provided between the light-emitting element and the backlight frame.

8. The backlight module according to claim 1, wherein the light guide plate is secured to the backlight frame from inside using a snap plate via a snap connection.

9. The backlight module according to claim 2, wherein the light guide plate is secured to the backlight frame from inside using a snap plate via a snap connection.

10. The backlight module according to claim 1, wherein the light-emitting element is an LED light source.

11. The backlight module according to claim 2, wherein the light-emitting element is an LED light source.

\* \* \* \* \*